US006956805B2

(12) United States Patent
Mashimo

(10) Patent No.: US 6,956,805 B2
(45) Date of Patent: Oct. 18, 2005

(54) SIGNAL PROCESSING CIRCUIT AND METHOD FOR EXTRACTING SUPERIMPOSED SIGNAL WITH ACCURACY

(75) Inventor: Akira Mashimo, Tokorozawa (JP)

(73) Assignee: TEAC Corporation, (JP)

( * ) Notice: Subject to any disclaimer, the term of this patent is extended or adjusted under 35 U.S.C. 154(b) by 640 days.

(21) Appl. No.: 10/209,496

(22) Filed: Jul. 30, 2002

(65) Prior Publication Data

US 2003/0053384 A1 Mar. 20, 2003

(30) Foreign Application Priority Data

Sep. 17, 2001 (JP) .............................. 2001-281777

(51) Int. Cl.[7] ............................................... G11B 5/09
(52) U.S. Cl. ............. 369/59.17; 369/59.1; 369/124.01; 369/124.15
(58) Field of Search ............................ 369/47.1, 47.17, 369/53.1, 59.1, 59.17, 59.2, 59.26, 124.01, 369/124.15

(56) References Cited

U.S. PATENT DOCUMENTS 6,483,457 B2 * 11/2002 Hirata et al. ........... 342/357.12

* cited by examiner

Primary Examiner—Muhammad Edun
(74) Attorney, Agent, or Firm—Anderson Kill & Olick, PC

(57) ABSTRACT

A signal processing circuit, which extracts a signal superimposed on a reference signal and having a peak level higher than a level of the reference signal by a value greater than a given value, includes a first pulse generation part generating a first binary signal by binarizing a composite signal of the reference signal and the superimposed signal by using a given slice level, a noise elimination part eliminating noise from the first binary signal by using a cumulative length of time of each of polarities of the first binary signal, a second pulse generation part generating a second binary signal by binarizing the composite signal by using a slice level higher than the level of the reference signal by a value smaller than or equal to the given value, and a gate part outputting the second binary signal based on a signal output from said noise elimination part.

31 Claims, 7 Drawing Sheets

SIGNAL PROCESSING CIRCUIT AND METHOD FOR EXTRACTING SUPERIMPOSED SIGNAL WITH ACCURACY

BACKGROUND OF THE INVENTION

1. Field of the Invention

The present invention generally relates to signal processing circuits and methods, and more particularly to a signal processing circuit and method for extracting a signal superimposed on a reference signal varying in level at a given frequency, the superimposed signal being inserted into the reference signal at given positions of a given level thereof.

2. Description of the Related Art

Recordable-type disks having grooves for information recording and reproduction, such as CDs and DVDs, include those conventionally known disks that have grooves meandering radially to form a wobble. Also known as such recordable-type disks are those having pre-pits formed on lands between adjacent grooves so as to synchronize intermittently with a wobble formed by the grooves. Hereinafter, such pre-pits are referred to as land pre-pits (LPPs).

A disk unit for recording information on and reproducing information from such disks includes an optical head opposing the surface of a disk attached to the disk unit. The optical head records information on the disk by emitting a laser light thereonto, and outputs a reproduced signal corresponding to the information recorded on the disk by receiving a reflected light from the disk. The information reproduced by the optical head includes a signal deriving from a wobble formed on the disk (hereinafter, referred to as a wobble signal) and a signal deriving from LPPs formed on the disk (hereinafter, referred to as an LPP signal). The disk unit extracts the wobble signal and the LPP signal from the information reproduced by the optical head. Then, based on the extracted signals, the disk unit obtains address information indicating the position of the disk, and controls the spindle motor rotating the disk. Accordingly, in order to have the disk unit function properly, it is necessary to generate, from the LPPs formed on the disk, the LPP signal complying properly with the LPPs.

In the case of a DVD-R/RW disk, the LPPs are formed as address information since no address information is superimposed on the wobble signal.

The LPPs are formed to have a given phase relation to the wobble signal. Normally, the LPPs are formed so that the LPP signal is superimposed on the wobble signal serving as a baseline voltage at the positions of the maximum amplitude of the wobble signal.

The DVD-R/RW disk is defined so as to include eight wobble waves in one EFM sync frame, and the address of the DVD-R/RW disk is represented by three-bit data expressed by the presence (=1) or absence (=0) of an LPP in the first three waves.

As described above, the LPPs formed on the disk synchronize intermittently with the wobble. Therefore, if the LPPs are detected based on the LPP signal only during a period in which the wobble signal is set to HIGH (at a high level), or at a given threshold value or over, noise can be prevented from being mistakenly detected as the LPP signal, so that the accuracy of LPP detection can be improved.

However, if the LPPs are detected based on the LPP signal only during the period in which the wobble signal generated based on the wobble of the disk is set to HIGH, the LPPs are detected even during a period in which noise is superimposed on the wobble signal due to dust or flaws on the surface of the disk. As a result, the accuracy of LPP detection is decreased. Accordingly, it is not adequate to base LPP detection timing only on the period in which the wobble signal is set to HIGH.

SUMMARY OF THE INVENTION

Accordingly, it is a general object of the present invention to provide a signal processing circuit and method in which the above-described disadvantages are eliminated.

A more specific object of the present invention is to provide a signal processing circuit and method that can extract, with good accuracy, a signal, such as an LPP signal, superimposed on a reference signal varying in level at a given frequency, such as a wobble signal, the superimposed signal being inserted into the reference signal at given positions of a given level thereof and having a peak level higher than the level of the reference signal by a value greater than a given value.

The above objects of the present invention are achieved by a signal processing circuit extracting a signal superimposed on a reference signal varying in level at a given frequency, the superimposed signal being inserted into the reference signal at given positions of a given level thereof and having a peak level higher than a level of the reference signal by a value greater than a given value, the signal processing circuit including a first pulse generation part generating a first binary signal by binarizing a composite signal of the reference signal and the superimposed signal by using a given reference level as a threshold value, a noise elimination part eliminating noise from the first binary signal by using a cumulative length of time of each of polarities of the first binary signal, a second pulse generation part generating a second binary signal by binarizing the composite signal by using, as a threshold value, a level higher than the level of the reference signal by a value smaller than or equal to the given value, and a gate part outputting the second binary signal based on a signal output from the noise elimination part.

According to the above-described signal processing circuit, the composite signal of a reference signal and a signal superimposed thereon is binarized using a given reference level as a threshold value, and thereafter, noise is eliminated from the binarized signal using the cumulative length of time of each polarity of the binarized signal. The superimposed signal whose peak level is higher by more than a given value than the level of the reference signal is extracted based on a binary signal obtained by binarizing the composite signal by using, as a threshold value, a level higher than the level of the reference signal by a value smaller than or equal to the given value, the binary signal being output in accordance with the noise-eliminated signal. That is, according to the above-described configuration, timing for extracting the superimposed signal is based on the noise-eliminated signal. Therefore, according to the present invention, there is no noise causing the superimposed signal to be extracted. Accordingly, the superimposed signal on the reference signal can be extracted with good accuracy.

The above objects of the present invention are also achieved by a signal processing circuit extracting a signal superimposed on a reference signal varying in level at a given frequency, the superimposed signal being inserted into the reference signal at given positions of a given level thereof and having a peak level higher than a peak level of the reference signal, the signal processing circuit including a first pulse generation part generating a first binary signal by binarizing a composite signal of the reference signal and the superimposed signal by using a given reference level as a threshold value, a noise elimination part eliminating noise from the first binary signal by using a cumulative length of time of each of polarities of the first binary signal, a second pulse generation part generating a second binary signal by binarizing the composite signal by using, as a threshold value, a level higher than the peak level of the reference signal by a value smaller than or equal to the given value, and a gate part outputting the second binary signal based on a signal output from the noise elimination part.

According to the above-described signal processing circuit, timing for extracting the superimposed signal is based on the noise-eliminated signal. Therefore, there is no noise causing the superimposed signal to be extracted. Accordingly, the superimposed signal on the reference signal can be extracted with good accuracy.

The above objects of the present invention are further achieved by a method of extracting a signal superimposed on a reference signal varying in level at a given frequency, the superimposed signal being inserted into the reference signal at given positions of a given level thereof and having a peak level higher than a level of the reference signal by a value greater than a given value, the method including the steps of (a) generating a first binary signal by binarizing a composite signal of the reference signal and the superimposed signal by using a given reference level as a threshold value, (b) eliminating noise from the first binary signal by using a cumulative length of time of each of polarities of the first binary signal, (c) generating a second binary signal by binarizing the composite signal by using, as a threshold value, a level higher than the level of the reference signal by a value smaller than or equal to the given value, and (d) outputting the second binary signal based on a signal generated by said step (b).

According to the above-described method, timing for extracting the superimposed signal is based on the noise-eliminated signal. Therefore, there is no noise causing the superimposed signal to be extracted. Accordingly, the superimposed signal on the reference signal can be extracted with good accuracy.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
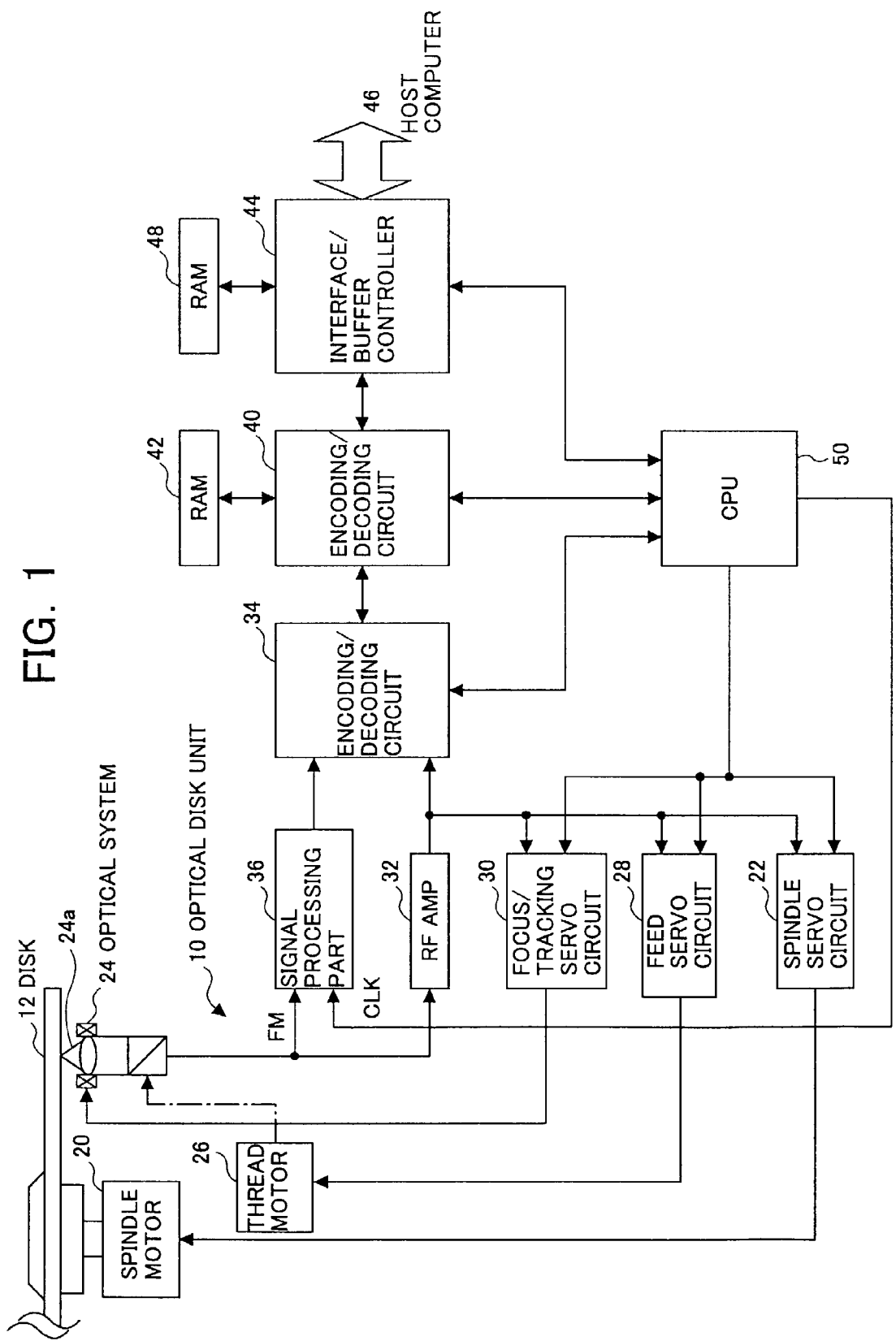
FIG. 1 is a block diagram showing an optical disk unit according to an embodiment of the present invention.
Figure 2:
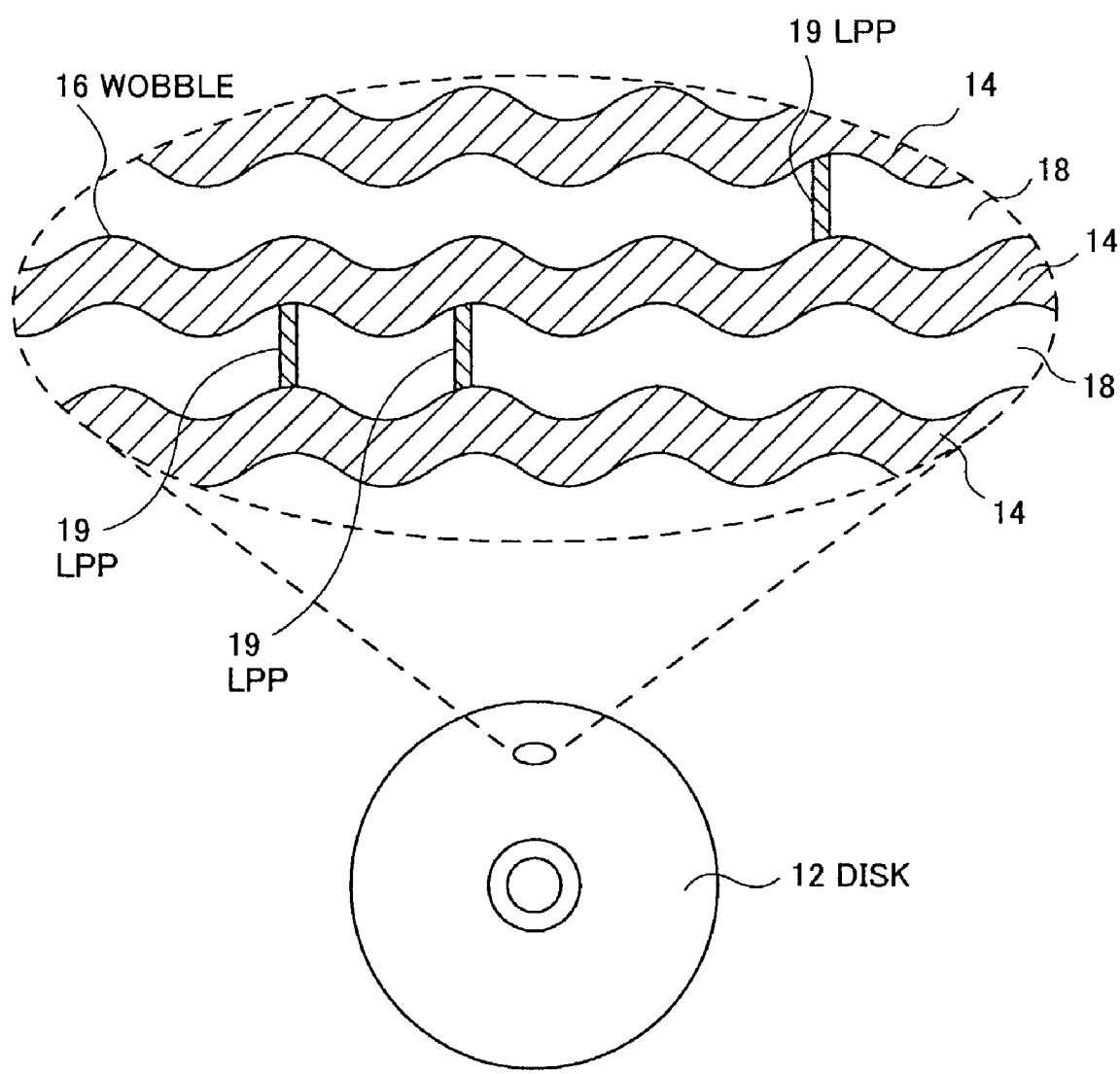
FIG. 2 is a diagram showing the configuration of a disk attached to the optical disk unit of FIG. 1.

FIG. 1 is a block diagram showing an optical disk unit 10 according to the embodiment of the present invention. FIG. 2 is a diagram showing the configuration of a disk 12 attached to the optical disk unit 10 of this embodiment.

In this embodiment, the optical disk unit 10 is a DVD-R/RW drive, for instance, and records information on and reproduces information from the disk 12, which is a DVD-R/RW disk, when the disk 12 is attached to the optical disk unit 10. As shown in FIG. 2, the disk 12 attached to the optical disk unit 10 includes grooves 14 as tracks on which information is recorded and from which information is reproduced. The grooves 14 meander in the radial directions of the disk 12 at a given frequency of approximately 140 kHz, for instance. That is, a sinusoidal (hereinafter referred to as sinusoidal) wobble 16 of the grooves 14 is formed on the disk 12. A land 18 is formed between each two of the grooves 14 that are adjacent in the radial directions. Land pre-pits (hereinafter, referred to as LPPs) 19 are formed on each land 18 at top peak positions of the wobble 16 toward the periphery of the disk 12, synchronizing with the phase of the wobble 16.

As shown in FIG. 1, the optical disk unit 10 includes a spindle motor 20. The spindle motor 20 has the function of rotating the disk 12 attached to the optical disk unit 10. A spindle servo circuit 22 is connected to the spindle motor 20. The spindle servo circuit 22 controls the spindle motor 20 so that the disk 12 is rotated at a given rate (rpm).

The optical disk unit 10 further includes an optical system 24. The optical system 24 has an optical head 24a arranged therein to oppose the surface of the disk 12 attached to the optical disk unit 10. The optical head 24a records information on the disk 12 by emitting a laser beam thereonto, and outputs a reproduced signal corresponding to information recorded on the disk 12 by receiving a reflected light from the disk 12.

The optical disk unit 10 further includes a thread motor 26. The thread motor 26 has the function of moving a carriage forming the optical system 24 in the radial directions of the disk 12. A feed servo circuit 28 is connected to the thread motor 26. The feed servo circuit 28 controls the thread motor 26 so that the carriage of the optical system 24 is located at a given position in the radial directions of the disk 12.

The optical system 24 includes a focus and tracking actuator (not shown in the drawing) that performs focus control and tracking control on the optical system 24. A focus and tracking servo circuit 30 is connected to the focus and tracking actuator. The focus and tracking servo circuit 30 controls the focus and tracking actuator so that focus control and tracking control are performed on the optical system 24 in compliance with given rules. By thus driving the thread motor 26 and the focus and tracking actuator, the position of the laser beam emitted from the optical system 24 onto the disk 12 is controlled.

An RF amplifier 32 is connected to the optical system 24. The reproduced signal corresponding to the information recorded on the disk 12 is output from the optical head 24a and supplied to the RF amplifier 32. The RF amplifier 32 amplifies the reproduced signal. An encoding and decoding circuit 34 is connected to the RF amplifier 32. The main signal of the reproduced signal amplified in the RF amplifier 32 is supplied to the encoding and decoding circuit 34. The encoding and decoding circuit 34 extracts servo signals from the signal supplied from the RF amplifier 32, and outputs the servo signals to the above-described servo circuits 22, 28, and 30.

A signal processing part 36 is connected to the optical system 24. The reproduced signal output from the optical head 24a includes a sinusoidal signal based on the wobble 16 formed on the disk 12 (hereinafter, this signal is referred to as a wobble signal) and a signal based on the LPPs 19 formed on the disk 12 (hereinafter, this signal is referred to as an LPP signal). The signal processing part 36 extracts the sinusoidal wobble signal and the LPP signal from the reproduced signal output from the optical head 24a, and processes the extracted signals as later described in detail. The signal processing part 36 is also connected to the encoding and decoding circuit 34. The encoding and decoding circuit 34 decodes a signal supplied from the signal processing part 36 and extracts address information indicating the track position of the disk 12 from the decoded signal.

An encoding and decoding circuit 40 is connected to the encoding and decoding circuit 34. The encoding and decoding circuit 40 encodes and decodes an error correcting code (ECC) characteristic of the disk 12, and detects a header. The encoding and decoding circuit 40 includes a RAM 42. The RAM 42 is employed as a working storage for processing performed in the encoding and decoding circuit 40.

An interface and buffer controller 44 is connected to the encoding and decoding circuit 40. The interface and buffer controller 44 is also connected to a host computer 46 so as to transmit information to and receive information from the host computer 46 and control a data buffer. The interface and buffer controller 44 includes a RAM 48. The RAM 48 is employed as a working storage for the interface and buffer controller 44.

The encoding and decoding circuits 34 and 40 and the interface and buffer controller 44 are connected to a CPU 50. The CPU 50 controls the entire optical disk unit 10 based on commands from the host computer 46. Specifically, the CPU 50 performs control by the spindle servo circuit 22, the feed servo circuit 28, and the focus and tracking servo circuit 30, and performs laser beam control in the optical system 24. In FIG. 1, the block of a recording system is omitted for convenience of description.

Information to be reproduced included in the main signal of the reproduced signal is processed in the encoding and decoding circuits 34 and 40 after being amplified in the RF amplifier 32, and thereafter, is output to the host computer 46 through the interface and buffer controller 44.

Figure 3:
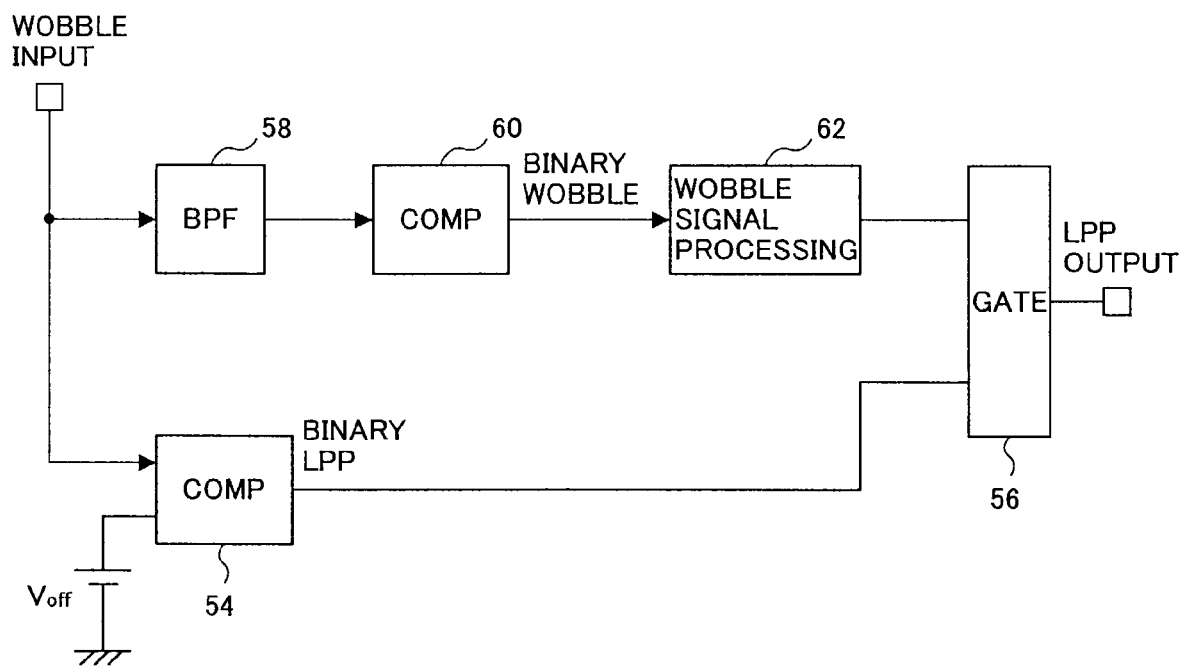
FIG. 3 is a block diagram showing an LPP detection circuit provided in a signal processing part of the optical disk unit of FIG. 1.

FIG. 3 is a block diagram showing an LPP detection circuit 52 provided in the signal processing part 36 of the optical disk unit 10 according to this embodiment. The LPP detection circuit 52 includes a comparator 54. The comparator 54 is supplied with the sinusoidal wobble signal of a single frequency corresponding to the wobble 16 of the disk 12 with the LPP signal corresponding to the LPPs 19 being superimposed on the wobble signal 16. Hereinafter, the wobble signal on which the LPP signal is superimposed is referred to as a wobble-LPP composite signal. As described above, the LPPs 19 are formed on the disk 12 at the top peak positions of the wobble 16 toward the periphery of the disk 12. Therefore, the peak level of the LPP signal exceeds the peak level of the sinusoidal wobble signal.

The comparator 54 compares the wobble-LPP composite signal supplied from the optical head 24a with a constant slice level higher than the peak value (maximum value) of the sinusoidal wobble signal. If the comparison results show that the peak value of the wobble-LPP composite signal is lower than the slice level, the comparator 54 outputs a low-level signal, and if the comparison results show that the peak value of the wobble-LPP composite signal is higher than or equal to the slice level, the comparator 54 outputs a high-level signal. That is, the comparator 54 generates a pulse signal by converting the LPP signal superimposed on the wobble signal into binary digital data. Hereinafter, this pulse signal is referred to as a binary LPP signal. The output of the comparator 54 is supplied to a gate 56.

The LPP detection circuit 52 further includes a bandpass filter (hereinafter referred to as a BPF) 58. The wobble-LPP composite signal is supplied from the optical head 24a of the optical system 24 to the BPF 58. The BPF 58 is a filter that passes the frequency band of the sinusoidal wobble signal. The output of the BPF 58 is supplied to a comparator 60. The comparator 60 compares the sinusoidal wobble signal passing the BPF 58 with a zero slice level. If the comparison results show that the wobble signal is higher than or equal to the zero level, the comparator 60 outputs a high-level signal. If the comparison results show that the wobble signal is lower than the zero level, the comparator 60 outputs a low-level signal. That is, the comparator 60 generates a pulse signal by converting the sinusoidal wobble signal into binary digital data. Hereinafter, this pulse signal is referred to as a binary wobble signal.

The output of the comparator 60 is supplied to a wobble signal processing circuit 62 connected to the gate 56. The gate 56 passes the binary LPP signal supplied from the comparator 54 when the output signal of the wobble signal processing circuit is set to HIGH. As will be described later, the wobble signal processing circuit 62 generates a gate control signal controlling the gate 56. The LPP detection circuit 52 processes the binary LPP signal passing the gate 56 as the address information of the disk 12, and supplies the binary LPP signal to the encoding and decoding circuit 34.

Figure 4:
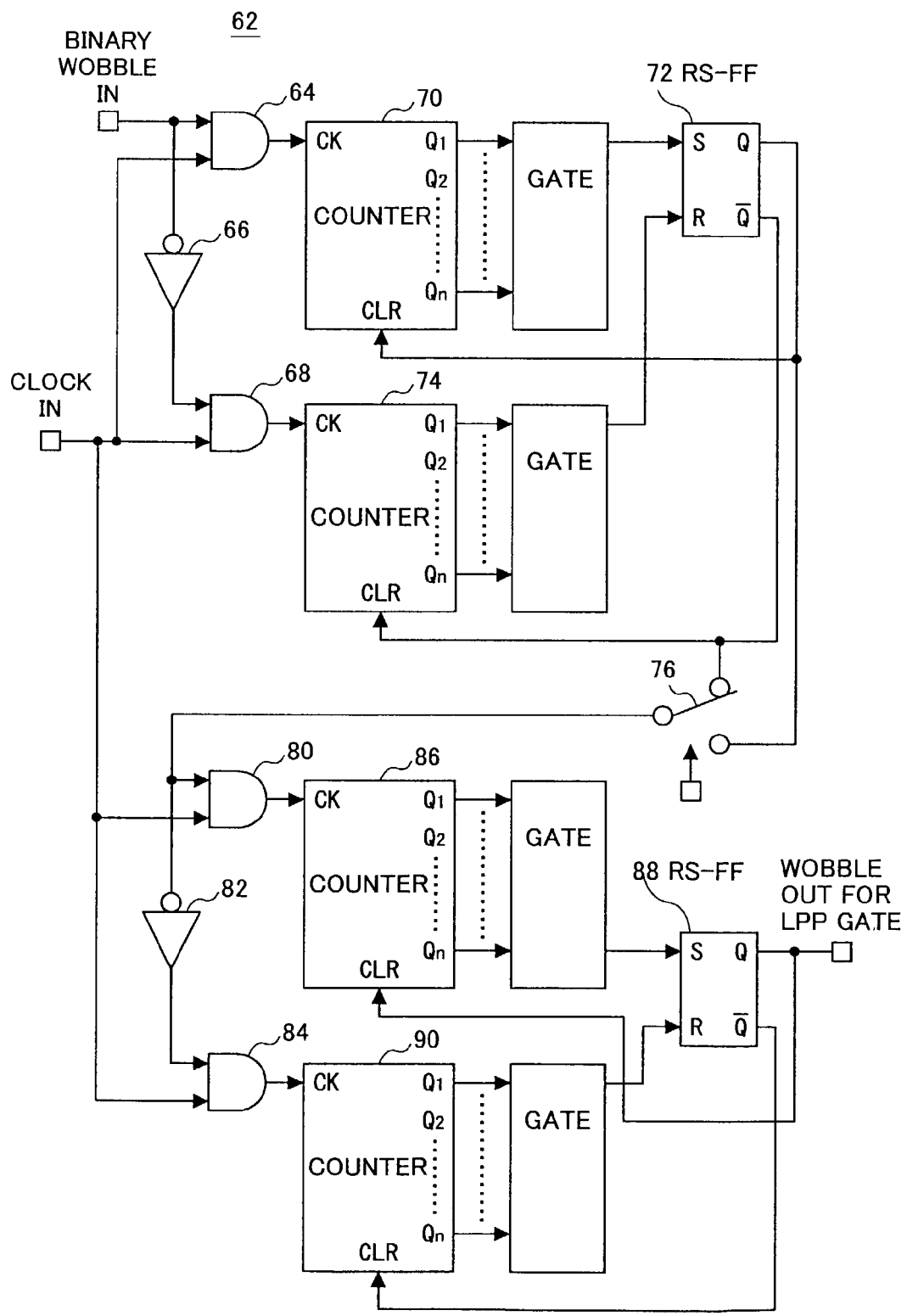
FIG. 4 is a block diagram showing a wobble signal processing circuit provided in the LPP detection circuit of FIG. 3.

FIG. 4 is a block diagram showing the wobble signal processing circuit 62 provided in the LPP detection circuit 52 of the optical disk unit 10 of this embodiment. The binary wobble signal is input to the wobble signal processing circuit 62. The input terminal of the wobble signal processing circuit 62 is connected to an AND gate 64, and also to an AND gate 68 via an inverting circuit 66. A reference clock signal is supplied from the CPU 50 to both AND gates 64 and 68. The AND gate 64 passes the reference clock signal supplied from the CPU 50 when the binary wobble signal obtained as a result of putting in binary form, or binarizing, the wobble signal in the comparator 60 is set to HIGH.

The output terminal of the AND gate 64 is connected to the clock input terminal of a high gate counter 70. The reference clock signal passing the AND gate 64 is supplied to the high gate counter 70. The high gate counter 70 has the function of counting the number of supplied reference clock pulses. The output terminal of the high gate counter 70 is connected to the set terminal of an RS flip-flop 72. The high gate counter 70 supplies the set terminal of the RS flip-flop 72 with the value $Q_i$ of the $i^{th}$ digit of a count value obtained by counting the number of reference clock pulses.

The inverting circuit 66 inverts the binary wobble signal obtained as a result of binarizing the wobble signal in the comparator 60, and supplies the inverted signal to the AND gate 68. The AND gate 68 passes the reference clock signal supplied from the CPU 50 when the signal supplied from the inverting circuit 66 is set to HIGH, that is, when the binary wobble signal supplied from the comparator 60 is set to LOW (at a low level). The output terminal of the AND gate 68 is connected to the clock input terminal of a low gate counter 74. The low gate counter 74 has the function of counting the number of supplied reference clock pulses. The output terminal of the low gate counter 74 is connected to the reset terminal of the RS flip-flop 72. The low gate counter 74 supplies the reset terminal of the RS flip-flop 72 with the value $Q_i$ of the $i^{th}$ digit of a count value obtained by counting the number of reference clock pulses.

That is, when the value $Q_i$ of the $i^{th}$ digit of the count value of the high gate counter 70 rises, the RS flip-flop 72 is set, that is, the non-inverted output Q of the RS flip-flop 72 is set to HIGH and the inverted output /Q thereof is set to LOW. When the value $Q_i$ of the $i^{th}$ digit of the count value of the low gate counter 74 rises, the RS flip-flop 72 is reset, that is, the non-inverted output Q of the RS flip-flop 72 is set to LOW and the inverted output /Q thereof is set to HIGH. Here, /Q represents the inversion of Q.

The non-inverted output Q of the RS flip-flop 72 is connected to the clear terminal of the high gate counter 70. The high gate counter 70 is cleared when the non-inverted output Q of the RS flip-flop 72 is set to HIGH. The inverted output /Q of the RS flip-flop 72 is connected to the clear terminal of the low gate counter 74. The low gate counter 74 is cleared when the inverted output /Q of the RS flop-flop 72 is set to HIGH.

One of the non-inverted output Q and the inverted output /Q of the RS flip-flop 72 is selectively connected to one end of a switch 76. The other end of the switch 76 is connected to an AND gate 80 and further to an AND gate 84 via an inverting circuit 82. Based on a command supplied from the CPU 50, the switch 76 selectively connects one of the non-inverted output Q and the inverted output /Q of the RS flip-flop 72 to the AND gates 80 and 84.

The reference clock signal is supplied from the CPU 50 to both AND gates 80 and 84. When the AND gate 80 is connected to the non-inverted output Q of the RS flip-flop 72 by the operation of the switch 76, the AND gate 80 passes the reference clock signal when the non-inverted output Q is set to HIGH. On the other hand, when the AND gate 80 is connected to the inverted output /Q of the RS flip-flop 72 by the operation of the switch 76, the AND gate 80 passes the reference clock signal when the inverted output /Q is set to HIGH.

The output terminal of the AND gate 80 is connected to the clock input terminal of a high gate counter 86. The reference clock signal passing the AND gate 80 is supplied to the high gate counter 86. The high gate counter 86 has the function of counting the number of supplied reference clock pulses. The output terminal of the high gate counter 86 is connected to the set terminal of an RS flip-flop 88. The high gate counter 86 supplies the set terminal of the RS flip-flop 88 with the value $Q_j$ of the $j^{th}$ digit of a count value obtained by counting the number of reference clock pulses.

The inverting circuit 82 inverts the non-inverted output Q or the inverted output /Q of the RS flip-flop 88, and supplies the inverted signal to the AND gate 84. The AND gate 84 passes the reference clock signal when the signal supplied from the inverting circuit 82 is set to HIGH, that is, when the non-inverted output Q of the RS flip-flop 72 is set to LOW in the case of being connected thereto by the operation of the switch 76 and when the inverted output /Q of the RS flip-flop 72 is set to LOW in the case of being connected thereto by the operation of the switch 76.

The output terminal of the AND gate 84 is connected to the clock input terminal of a low gate counter 90. The reference clock signal passing the AND gate 84 is supplied to the low gate counter 90. The low gate counter 90 has the function of counting the number of supplied reference clock pulses. The output terminal of the low gate counter 90 is connected to the reset terminal of the RS flip-flop 88. The low gate counter 90 supplies the reset terminal of the RS flip-flop 88 with the value $Q_j$ of the $j^{th}$ digit of a count value obtained by counting the number of reference clock pulses.

That is, when the value $Q_j$ of the $j^{th}$ digit of the count value of the high gate counter 86 rises, the RS flip-flop 88 is set, that is, the non-inverted output Q of the RS flip-flop 88 is set to HIGH and the inverted output /Q thereof is set to LOW. When the value $Q_j$ of the $j^{th}$ digit of the count value of the low gate counter 90 rises, the RS flip-flop 88 is reset, that is, the non-inverted output Q of the RS flip-flop 88 is set to LOW and the inverted output /Q thereof is set to HIGH.

The non-inverted output Q of the RS flip-flop 88 is connected to the gate 56 as the output terminal of the wobble signal processing circuit for passing the binary LPP signal supplied from the comparator 54, and is also connected to the clear terminal of the high gate counter 86. The high gate counter 86 is cleared when the non-inverted output Q of the RS flip-flop 88 is set to HIGH. The inverted output /Q of the RS flip-flop 88 is connected to the clear terminal of the low gate counter 90. The low gate counter 90 is cleared when the inverted output /Q of the RS flip-flop 88 is set to HIGH.

Next, a description will be given, with reference to FIG. 5, of an operation of the wobble signal processing circuit 62 shown in FIG. 4.

Figure 5:
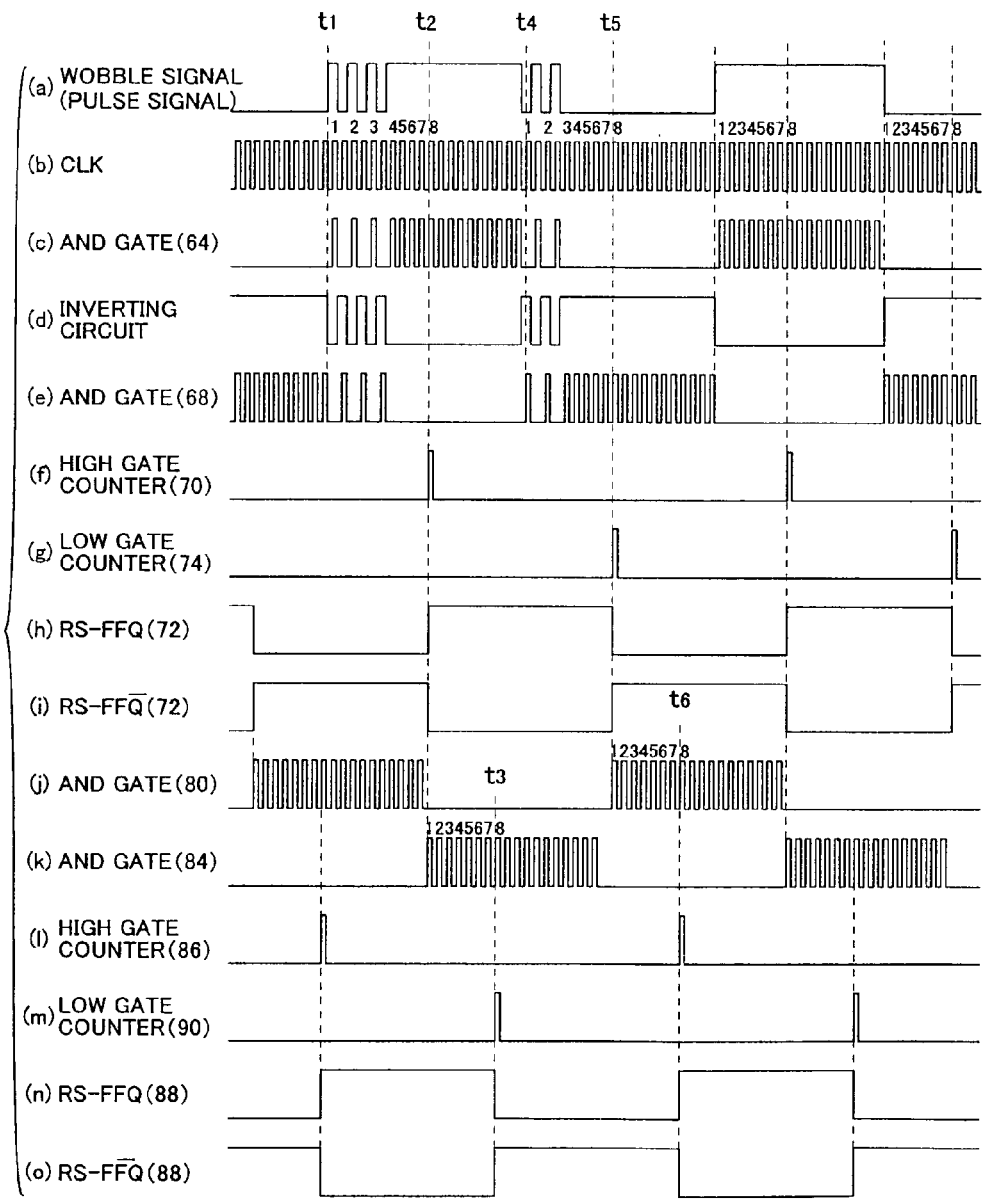
FIG. 5 is a timing chart of signals showing an operation of the wobble signal processing circuit of FIG. 4.

FIG. 5 is a timing chart of signals showing the operation of the wobble signal processing circuit 62 according to this embodiment. In FIG. 5, (a) indicates the output waveform of the comparator 60, (b) indicates the reference clock signal (pulses), (c) indicates the output waveform of the AND gate 64, (d) indicates the output waveform of the inverting circuit 66, (e) indicates the output waveform of the AND gate 68, (f) indicates the output waveform of the high gate counter 70, (g) indicates the output waveform of the low gate counter 74, (h) indicates the waveform of the non-inverted output Q of the RS flip-flop 72, (i) indicates the waveform of the inverted output /Q of the RS flip-flop 72, (j) indicates the output waveform of the AND gate 80, (k) indicates the output waveform of the AND gate 84, (l) indicates the output waveform of the high gate counter 86, (m) indicates the output waveform of the low gate counter 90, (n) indicates the waveform of the non-inverted output Q of the RS flip-flop 88, and (o) indicates the waveform of the inverted output /Q of the RS flip-flop 88.

Before a time $t_1$, with the binary wobble pulse signal output from the comparator 60 being maintained to LOW, the non-inverted output Q of the RS flip-flop 72 is maintained to LOW and the inverted output /Q thereof is maintained to HIGH. Therefore, the clear state of the high gate counter 70 is canceled, while the low gate counter 74 is cleared as shown in (g) of FIG. 5.

When the binary wobble pulse signal is switched to HIGH from the above-described state at the time $t_1$ as shown in (a) of FIG. 5, the AND gate 64, as shown in (c) of FIG. 5, passes the reference clock signal only while the binary wobble pulse signal is set to HIGH, thereby causing the high gate counter 70 to start to count the number of reference clock pulses. When the binary wobble pulse signal is switched from HIGH to LOW, the AND gate 64 stops passing the reference clock signal. Therefore, the high gate counter 70 suspends counting of the number of reference clock pulses while the binary wobble pulse signal is set to LOW.

For instance, if the high gate counter 70 is to supply the value $Q_4$ of the fourth digit of its count value to the set terminal of the RS flip-flop 72 in order to eliminate noise that can be superimposed on the binary wobble pulse signal supplied from the comparator 60, the output of the high gate counter 70 is maintained to LOW until the high gate counter 70 counts eight reference clock pulses. When the eighth reference clock pulse is counted at a time $t_2$, the output of the high gate counter 70 is switched to HIGH as shown in (f) of FIG. 5. When the high-level signal is supplied to the set terminal of the RS flip-flop 72, the non-inverted output Q of the RS flip-flop 72 is switched to HIGH as shown in (h) of FIG. 5, while the inverted output /Q thereof is switched to LOW as shown in (i) of FIG. 5. When the non-inverted output Q of the RS flip-flop 72 is set to HIGH, the high gate counter 70 is cleared. When the inverted output /Q of the RS flip-flop 72 is set to LOW, the clear state of the low gate counter 74 is canceled.

With the switch 76 connecting the inverted output /Q of the RS flip-flop 72 to the AND gates 80 and 84, if the non-inverted output Q of the RS flip-flop 72 is switched to HIGH and the inverted output /Q thereof is switched to LOW, the AND gate 84, as shown in (k) of FIG. 5, passes the reference clock signal only while the non-inverted output Q is set to HIGH and the inverted output /Q is set to LOW, thereby causing the low gate counter 90 to count the number of reference clock pulses.

For instance, if the low gate counter 90 is to supply the value $Q_4$ of the fourth digit of its count value to the reset terminal of the RS flip-flop 88 so as to delay the non-inverted output Q of the RS flip-flop 72 so that the LPP signal corresponding to the LPPs 19 rises when the non-inverted output Q of the RS flip-flop 88 is set to HIGH, the output of the low gate counter 90 is maintained to LOW until the low gate counter 90 counts eight reference clock pulses. When the eighth reference clock pulse is counted at a time $t_3$, the output of the low gate counter 90 is switched to HIGH as shown in (m) of FIG. 5. In this case, a high-level signal is supplied to the reset terminal of the RS flip-flop 88.

When the high-level signal is supplied to the reset terminal of the RS flip-flop 88, the RS flip-flop 88 is reset with the non-inverted output Q and the inverted output /Q being switched to LOW and HIGH, respectively, as shown in (n) and (o) of FIG. 5. When the non-inverted output Q of the RS flip-flop 88 is set to LOW, the clear state of the high gate counter 86 is canceled. When the inverted output /Q of the RS flip-flop 88 is set to HIGH, the low gate counter 90 is cleared.

Further, when the non-inverted output Q of the RS flip-flop 88 is set to LOW, a low-level signal is supplied to the gate 56 of the LPP detection circuit 52. In this case, the gate 56 is prevented from passing the binary LPP signal supplied from the comparator 54. Therefore, even if a high-level signal resulting from noise is superimposed on the binary LPP signal supplied from the comparator 54, the superimposed signal is prevented from being detected as the LPP signal corresponding to the LPPs 19.

Next, when the binary wobble pulse signal is switched from HIGH to LOW at a time $t_4$, the AND gate 68, as shown in (e) of FIG. 5, passes the reference clock signal only while the binary wobble pulse signal is set to LOW, thereby causing the low gate counter 74 to start to count the number of reference clock pulses. When the binary wobble pulse signal is switched from LOW to HIGH, the AND gate 68 stops passing the reference clock signal. Therefore, the low gate counter 74 suspends counting of the number of reference clock pulses.

For instance, if the low gate counter 74 is to supply the value $Q_4$ of the fourth digit of its count value to the reset terminal of the RS flip-flop 72 in order to eliminate noise that can be superimposed on the binary wobble signal supplied from the comparator 60, the output of the low gate counter 74 is maintained to LOW until the low gate counter counts eight reference clock pulses. When the eighth reference clock pulse is counted at a time $t_5$, the output of the low gate counter 74 is switched to HIGH as shown in (g) of FIG. 5. When the high-level signal is supplied to the reset terminal of the RS flip-flop 72, the non-inverted output Q and the inverted output /Q of the RS flip-flop 72 are switched to LOW and HIGH, respectively, as shown in (h) and (i) of FIG. 5. When the non-inverted output Q of the RS flip-flop 72 is set to LOW, the clear state of the high gate counter 70 is canceled. When the inverted output /Q of the RS flip-flop 72 is set to HIGH, the low gate counter 74 is cleared.

With the switch 76 connecting the inverted output /Q of the RS flip-flop 72 to the AND gates 80 and 84, if the non-inverted output Q and the inverted output /Q of the RS flip-flop 72 are switched to LOW and HIGH, respectively, the AND gate 80, as shown in (j) of FIG. 5, passes the reference clock signal only while the non-inverted output Q and the inverted output /Q of the RS flip-flop 72 are set to LOW and HIGH, respectively, thereby causing the high gate counter 86 to start to count the number of reference clock pulses.

For instance, if the high gate counter 86 is to supply the value $Q_4$ of the fourth digit of its count value to the set terminal of the RS flip-flop 88 so as to delay the non-inverted output Q of the RS flip-flop 72 so that the LPP signal corresponding to the LPPs 19 rises when the non-inverted output Q of the RS flip-flop 88 is set to HIGH, the output of the high gate counter 86 is maintained to LOW until the high gate counter 86 counts eight reference clock pulses. When the eighth reference clock pulse is counted at a time $t_6$, the output of the high gate counter 86 is switched to HIGH as shown in (l) of FIG. 5. In this case, a high-level signal is supplied to the set terminal of the RS flip-flop 88.

When the high-level signal is supplied to the set terminal of the RS flip-flop 88, the RS flip-flop 88 is set with the non-inverted output Q and the inverted output /Q thereof being switched to HIGH and LOW, respectively, as shown in (n) and (o) of FIG. 5. When the non-inverted output Q of the RS flip-flop 88 is set to HIGH, the high gate counter 86 is cleared. When the inverted output /Q of the RS flip-flop 88 is set to LOW, the clear state of the low gate counter 90 is canceled.

Further, when the non-inverted output Q of the RS flip-flop 88 is set to HIGH, a high-level signal is supplied to the gate 56 of the LPP detection circuit 52. In this case, the gate 56 passes the binary LPP signal supplied from the comparator 54. Therefore, the binary LPP signal is extracted as the address information of the disk 12. That is, timing for extracting the binary LPP signal as address information is determined.

Figure 6:
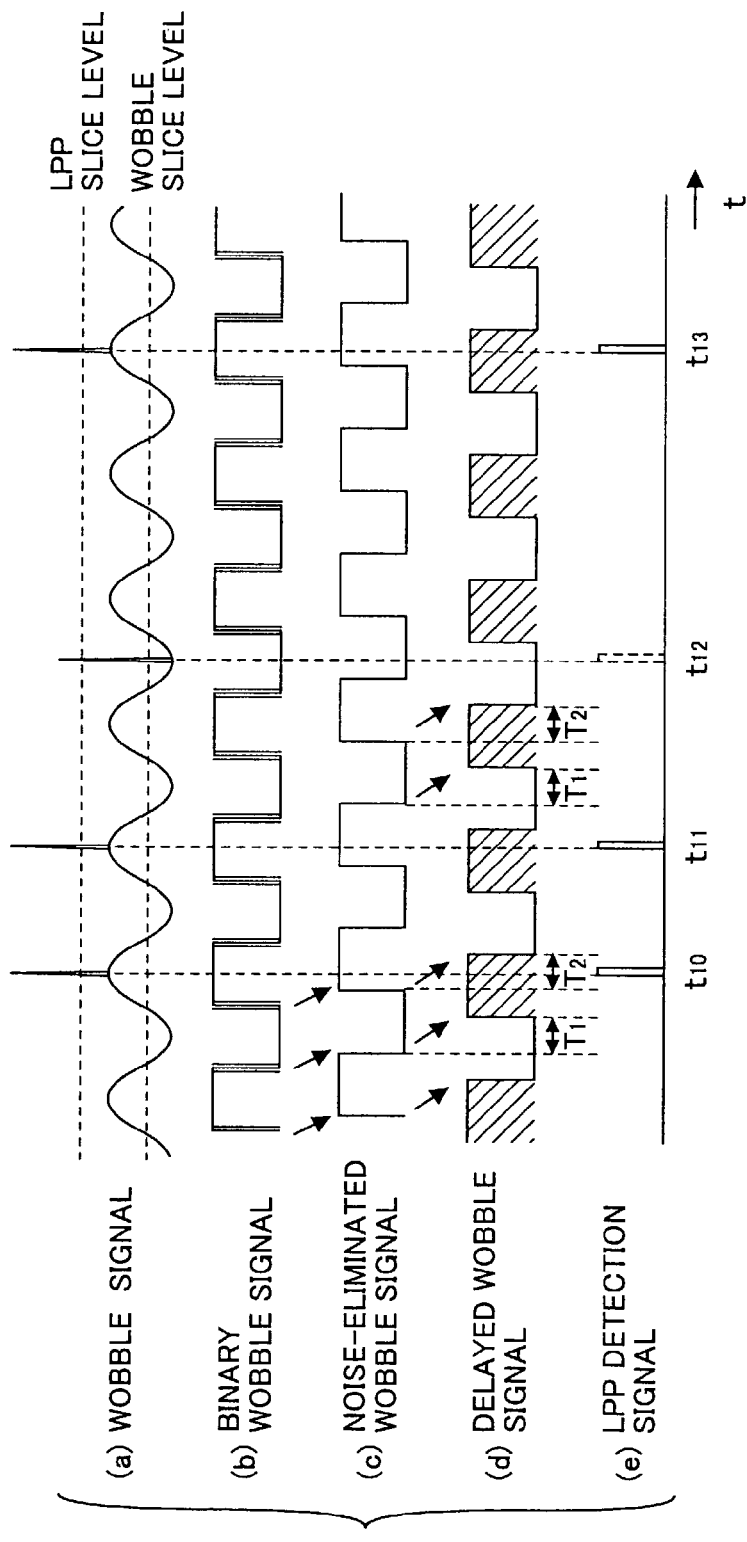
FIG. 6 is a timing chart of signals for illustrating timing for detecting LPPs formed on the disk of FIG. 2 according to the embodiment of the present invention.

FIG. 6 is a timing chart of signals for illustrating the timing for extracting the binary LPP signal as address information, that is, timing for detecting the LPPs 19 formed on the disk 12, in this embodiment. In FIG. 6, (a) indicates the input waveform of the comparator 60, (b) indicates the output waveform of the comparator 60, (c) indicates the waveform of the non-inverted output Q of the RS flip-flop 72, which waveform is obtained by eliminating noise from the binary wobble signal as the output waveform of the comparator 60, (d) indicates the waveform of the non-inverted output Q of the RS flip-flop 88, which waveform is obtained by inverting and delaying, for a give period of time, the non-inverted output Q of the RS flip-flop 72, and (e) indicates the output waveform of the gate 56.

In this embodiment, the LPP detection circuit 52 processes the binary LPP signal passing the gate 56 as the address information of the disk 12, and detects the LPPs 19 formed on the surface of the disk 12 to synchronize with the phase of the wobble 16. The gate 56 passes the binary LPP signal supplied from the comparator 54 only during a period in which the non-inverted output Q of the RS flip-flop 88 is set to HIGH.

The non-inverted output Q of the RS flip-flop 88 is obtained by inverting the non-inverted output Q of the RS flip-flop 72 and delaying the fall and the rise of the non-inverted output Q for a time $T_1$ and a time $T_2$ in (d) of FIG. 6, respectively. The time $T_1$ is a period required before the value $Q_j$ of the $j^{th}$ digit of the count value of the high gate counter 86 is set, and the time $T_2$ is a period required before the value $Q_j$ of the $j^{th}$ digit of the count value of the low gate counter 90 is set. In this embodiment, the value $Q_j$ of the $j^{th}$ digit is set in both the high gate counter 86 and the low gate counter 90 as a value to be supplied to the RS flip-flop 88. Therefore, the time $T_1$ for delaying the fall of the non-inverted output Q of the RS flip-flop 72 and the time $T_2$ for delaying the rise thereof are the same. The delay time $T_1$ and the delay time $T_2$ may be different from each other by setting different values to be supplied to the RS flip-flop 88 in the high gate counter 86 and the low gate counter 90. In this case, the pulse width of the signal of the non-inverted output Q of the RS flip-flop 88 is different from the pulse width of the signal of the non-inverted output Q of the RS flip-flop 72.

Further, the non-inverted output Q of the RS flip-flop 72 is obtained by eliminating noise from the binary wobble signal obtained by binarizing, in the comparator 60, the sinusoidal wobble signal based on the wobble 16 formed on the disk 12. Accordingly, the non-inverted output Q of the RS flip-flop 88 is a signal obtained by eliminating noise from the binary wobble signal supplied from the comparator 60, inverting the noise-eliminated (noiseless) binary wobble signal, and delaying the inverted binary wobble signal for the above-described given periods.

With respect to this point, in this embodiment, even if the binary wobble signal output from the comparator 60 is affected by noise (at a time $t_{12}$ in FIG. 6), the noise is prevented from causing the non-inverted output Q of the RS flip-flop 88 to be switched to HIGH. Therefore, noise in the binary wobble signal is prevented from causing the binary LPP signal supplied from the comparator 54 to pass the gate 56, and even if the binary LPP signal is set to HIGH due to noise or a flaw on the surface of the disk 12, such a HIGH state is not detected mistakenly as one of the LPPs 19 as shown in (e) of FIG. 6 at the time $t_{12}$. Therefore, according to this embodiment, the LPP signal can be extracted with accuracy by eliminating noise from the binary wobble signal supplied from the comparator 60, with the result that the accuracy of detecting the LPPs 19 is increased.

Further, as described above, the non-inverted output Q of the RS flip-flop 88 is the signal obtained by eliminating noise from the binary wobble signal supplied from the comparator 60, inverting the noise-eliminated binary wobble signal, and delaying the inverted signal for the above-described given periods. This inversion is realized by the operation of the switch 76, and is switchable based on a command supplied from the CPU 50 to the switch 76. This delay can be realized by the operations of the AND gates 80 and 84, the inverting circuit 82, the high gate counter 86, the low gate counter 90, and the RS flip-flop 88. The delay time $T_1$ and the delay time $T_2$ can be set variably by changing a count value to be supplied from the high gate counter 86 and the low gate counter 90, respectively, to the RS flip-flop 88.

With respect to this point, in this embodiment, timing for the binary wobble signal binarized in the comparator 54 passing the gate 56, that is, timing for detecting the LPPs 19 based on the LPP signal, can be changed in accordance with switching of the switch 76 and values to be supplied to the RS flip-flop 88 set in the high gate counter 86 and the low gate counter 90. Therefore, the timing for detecting the LPPs 19, or timing for detecting the LPP signal, can be set to appropriate instants at which the LPP signal corresponding to the LPPs 19 rises. Therefore, according to this embodiment, the timing for detecting the LPPs 19 can be set as desired, so that the accuracy of detecting the LPPs 19 is increased.

In this embodiment, the non-inverted output Q of the RS flip-flop 88 is the inverted and delayed non-inverted output Q of the RS flip-flop 72. However, the non-inverted output Q of the RS flip-flop 88 may be obtained, with the switch 76 connecting the non-inverted output Q of the RS flip-flop 72 to the AND gates 80 and 84, by only delaying the non-inverting output Q of the RS flip-flop 72 without inversion thereof. In this case, the delay time may be set so that the LPP signal corresponding to the LPPs 19 may rise when the non-inverted output Q of the RS flip-flop 88 is set to HIGH.

Figure 7:
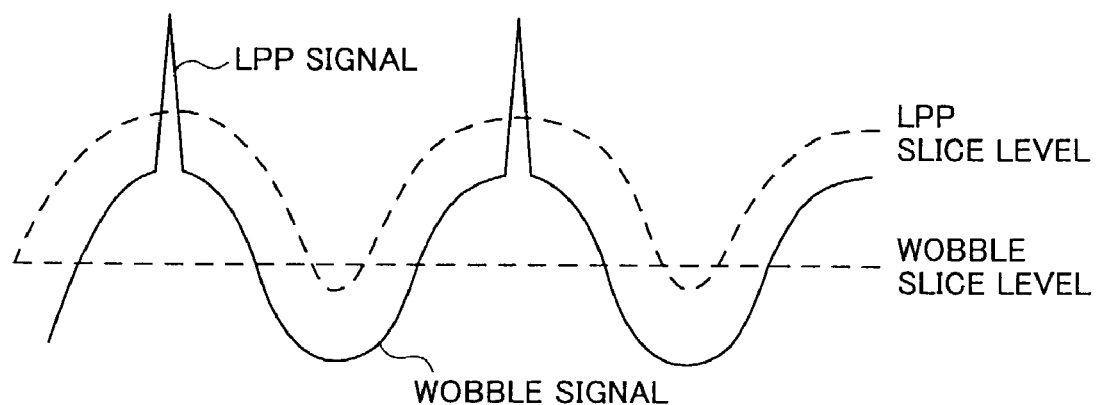
FIG. 7 is a diagram for illustrating a method of generating a binary LPP signal according to the present invention.

Further, in the above-described embodiment, the binary LPP signal is generated by comparing the wobble-LPP composite signal with the constant slice level higher than the maximum value of the sinusoidal wobble signal. The present invention is not limited to this method in generating the binary LPP signal, but the binary LPP signal may be generated by comparing the wobble-LPP composite signal with a slice level that is higher than the level of the sinusoidal wobble signal and synchronizes with the sinusoidal wobble signal to vary in level within a given range from the level of the sinusoidal wobble signal as shown in FIG. 7. In this case, the LPP signal can also be detected with accuracy as in the above-described embodiment.

Figure 8:
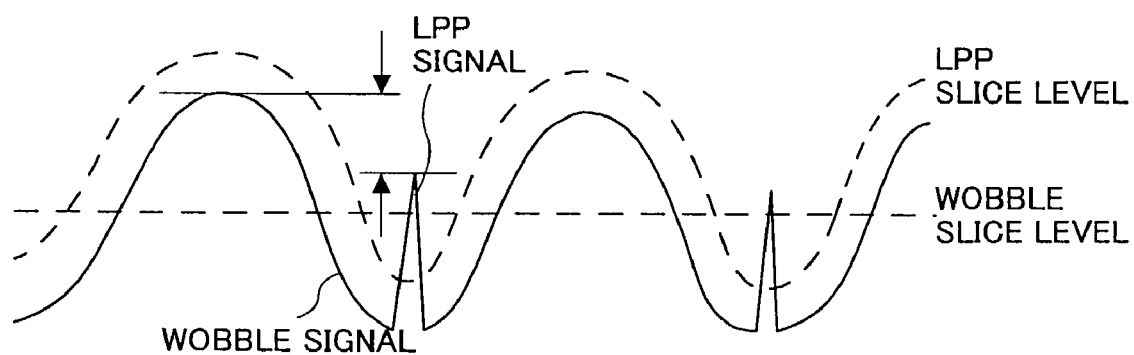
FIG. 8 is a diagram for illustrating another method of generating the binary LPP signal according to the present invention.

Further, in the above-described embodiment, the LPPs 19 are formed on the lands 18 of the disk 12 at the top peak positions of the wobble 16 toward the periphery of the disk 12 so that the peak level of the LPP signal exceeds the peak level of the sinusoidal wobble signal. The present invention is not limited to this configuration, but the LPPs 19 may be formed on the lands 18 of the disk 12 at bottom peak positions of the wobble 16 toward the periphery of the disk 12 so that the peak level of the LPP signal may not exceed the peak level of the sinusoidal wobble signal as shown in FIG. 8. In this configuration, the binary LPP signal is generated by comparing the wobble-LPP composite signal with a slice level that is higher than the level of the sinusoidal wobble signal and synchronizes with the sinusoidal wobble signal to vary within a given range from the level of the sinusoidal wobble signal. In this case, the LPP signal can also be detected with accuracy as in the above-described embodiment.

The present invention is not limited to the specifically disclosed embodiment, but variations and modifications may be made without departing from the scope of the present invention.

The present application is based on Japanese priority patent application No. 2001-281777 filed on Sep. 17, 2001, the entire contents of which are hereby incorporated by reference.

What is claimed is:

1. A signal processing circuit extracting a signal superimposed on a reference signal varying in level at a given frequency, the superimposed signal being inserted into the reference signal at given positions of a given level thereof and having a peak level higher than a level of the reference signal by a value greater than a given value, the signal processing circuit comprising:
- a first pulse generation part generating a first binary signal by binarizing a composite signal of the reference signal and the superimposed signal by using a given reference level as a threshold value;
- a noise elimination part eliminating noise from the first binary signal by using a cumulative length of time of each of polarities of the first binary signal;
- a second pulse generation part generating a second binary signal by binarizing the composite signal by using, as a threshold value, a level higher than the level of the reference signal by a value smaller than or equal to the given value; and
- a gate part outputting the second binary signal based on a signal output from said noise elimination part.

2. The signal processing circuit as claimed in claim 1, wherein said noise elimination part eliminates the noise from and delays, for a given period of time, the first binary signal.

3. The signal processing circuit as claimed in claim 2, wherein said noise elimination part comprises:
- a gate part for delaying that outputs given clock pulses based on the noise-eliminated first binary signal;
- a count part for delaying that counts the given clock pulses; and
- a clear part for delaying that switches a level of an output thereof between first and second values based on a count value of said count part and clears the count value based on the level of the output.

4. The signal processing circuit as claimed in claim 3, wherein:
said gate part for delaying comprises:
- a first gate part outputting the given clock pulses only during a period of a first polarity of the noise-eliminated first binary signal; and
- a second gate part outputting the given clock pulses only during a period of a second polarity of the noise-eliminated first binary signal;

said count part for delaying comprises:
- a first counter counting the given clock pulses output from said first gate part; and
- a second counter counting the given clock pulses output from said second gate part; and said clear part for delaying switches the level of the output thereof to the first value and clears a count value of said first counter when the count value of said first counter reaches a first count value, and switches the level of the output thereof to the second value and clears a count value of said second counter when the count value of said second counter reaches a second count value.

5. The signal processing circuit as claimed in claim 1, wherein said noise elimination part eliminates the noise from and changes a pulse width of the first binary signal.

6. The signal processing circuit as claimed in claim 5, wherein said noise elimination part comprises:
- a gate part for delaying that outputs given clock pulses based on the noise-eliminated first binary signal;
- a count part for delaying that counts the given clock pulses; and
- a clear part for delaying that switches a level of an output thereof between first and second values based on a count value of said count part and clears the count value based on the level of the output.

7. The signal processing circuit as claimed in claim 6, wherein:

said gate part for delaying comprises:
- a first gate part outputting the given clock pulses only during a period of a first polarity of the noise-eliminated first binary signal; and
- a second gate part outputting the given clock pulses only during a period of a second polarity of the noise-eliminated first binary signal;

said count part for delaying comprises:
- a first counter counting the given clock pulses output from said first gate part; and
- a second counter counting the given clock pulses output from said second gate part; and said clear part for delaying switches the level of the output thereof to the first value and clears a count value of said first counter when the count value of said first counter reaches a first count value, and switches the level of the output thereof to the second value and clears a count value of said second counter when the count value of said second counter reaches a second count value.

8. The signal processing circuit as claimed in claim 1, wherein said noise elimination part eliminates the noise from, delays, for a given period of time, and changes a pulse width of the first binary signal.

9. The signal processing circuit as claimed in claim 8, wherein said noise elimination part comprises:
- a gate part for delaying that outputs given clock pulses based on the noise-eliminated first binary signal;
- a count part for delaying that counts the given clock pulses; and
- a clear part for delaying that switches a level of an output thereof between first and second values based on a count value of said count part and clears the count value based on the level of the output.

10. The signal processing circuit as claimed in claim 9, wherein:
said gate part for delaying comprises:
- a first gate part outputting the given clock pulses only during a period of a first polarity of the noise-eliminated first binary signal; and
- a second gate part outputting the given clock pulses only during a period of a second polarity of the noise-eliminated first binary signal;

said count part for delaying comprises:
- a first counter counting the given clock pulses output from said first gate part; and
- a second counter counting the given clock pulses output from said second gate part; and said clear part for delaying switches the level of the output thereof to the first value and clears a count value of said first counter when the count value of said first counter reaches a first count value, and switches the level of the output thereof to the second value and clears a count value of said second counter when the count value of said second counter reaches a second count value.

11. The signal processing circuit as claimed in claim 1, wherein said noise elimination part comprises:
- a gate part for noise elimination that outputs given clock pulses based on the first binary signal;
- a count part for noise elimination that counts the given clock pulses; and
- a clear part for noise elimination that switches a level of an output thereof between first and second values based on a count value of said count part and clears the count value based on the level of the output.

12. The signal processing circuit as claimed in claim 11, wherein:
said gate part for noise elimination comprises:

a first gate part outputting the given clock pulses only during a period of a first polarity of the first binary signal; and
a second gate part outputting the given clock pulses only during a period of a second polarity of the first binary signal;
said count part for noise elimination comprises:
a first counter counting the given clock pulses output from said first gate part; and
a second counter counting the given clock pulses output from said second gate part; and
said clear part for noise elimination switches the level of the output thereof to the first value and clears a count value of said first counter when the count value of said first counter reaches a first count value, and switches the level of the output thereof to the second value and clears a count value of said second counter when the count value of said second counter reaches a second count value.

13. The signal processing circuit as claimed in claim 1, wherein said gate part outputs the second binary signal only during a period of one of polarities of the signal output from said noise elimination part.

14. A signal processing circuit extracting a signal superimposed on a reference signal varying in level at a given frequency, the superimposed signal being inserted into the reference signal at given positions of a given level thereof and having a peak level higher than a peak level of the reference signal, the signal processing circuit comprising:
a first pulse generation part generating a first binary signal by binarizing a composite signal of the reference signal and the superimposed signal by using a given reference level as a threshold value;
a noise elimination part eliminating noise from the first binary signal by using a cumulative length of time of each of polarities of the first binary signal;
a second pulse generation part generating a second binary signal by binarizing the composite signal by using, as a threshold value, a level higher than or equal to the peak level of the reference signal; and
a gate part outputting the second binary signal based on a signal output from said noise elimination part.

15. The signal processing circuit as claimed in claim 14, wherein said noise elimination part eliminates the noise from and delays, for a given period of time, the first binary signal.

16. The signal processing circuit as claimed in claim 15, wherein said noise elimination part comprises:
a gate part for delaying that outputs given clock pulses based on the noise-eliminated first binary signal;
a count part for delaying that counts the given clock pulses; and
a clear part for delaying that switches a level of an output thereof between first and second values based on a count value of said count part and clears the count value based on the level of the output.

17. The signal processing circuit as claimed in claim 16, wherein:
said gate part for delaying comprises:
a first gate part outputting the given clock pulses only during a period of a first polarity of the noise-eliminated first binary signal; and
a second gate part outputting the given clock pulses only during a period of a second polarity of the noise-eliminated first binary signal;
said count part for delaying comprises:

a first counter counting the given clock pulses output from said first gate part; and
a second counter counting the given clock pulses output from said second gate part; and
said clear part for delaying switches the level of the output thereof to the first value and clears a count value of said first counter when the count value of said first counter reaches a first count value, and switches the level of the output thereof to the second value and clears a count value of said second counter when the count value of said second counter reaches a second count value.

18. The signal processing circuit as claimed in claim 14, wherein said noise elimination part eliminates the noise from and changes a pulse width of the first binary signal.

19. The signal processing circuit as claimed in claim 18, wherein said noise elimination part comprises:
a gate part for delaying that outputs given clock pulses based on the noise-eliminated first binary signal;
a count part for delaying that counts the given clock pulses; and
a clear part for delaying that switches a level of an output thereof between first and second values based on a count value of said count part and clears the count value based on the level of the output.

20. The signal processing circuit as claimed in claim 19, wherein:
said gate part for delaying comprises:
a first gate part outputting the given clock pulses only during a period of a first polarity of the noise-eliminated first binary signal; and
a second gate part outputting the given clock pulses only during a period of a second polarity of the noise-eliminated first binary signal;
said count part for delaying comprises:
a first counter counting the given clock pulses output from said first gate part; and
a second counter counting the given clock pulses output from said second gate part; and
said clear part for delaying switches the level of the output thereof to the first value and clears a count value of said first counter when the count value of said first counter reaches a first count value, and switches the level of the output thereof to the second value and clears a count value of said second counter when the count value of said second counter reaches a second count value.

21. The signal processing circuit as claimed in claim 14, wherein said noise elimination part eliminates the noise from, delays, for a given period of time, and changes a pulse width of the first binary signal.

22. The signal processing circuit as claimed in claim 21, wherein said noise elimination part comprises:
a gate part for delaying that outputs given clock pulses based on the noise-eliminated first binary signal;
a count part for delaying that counts the given clock pulses; and
a clear part for delaying that switches a level of an output thereof between first and second values based on a count value of said count part and clears the count value based on the level of the output.

23. The signal processing circuit as claimed in claim 22, wherein:
said gate part for delaying comprises:
a first gate part outputting the given clock pulses only during a period of a first polarity of the noise-eliminated first binary signal; and a second gate part outputting the given clock pulses only during a period of a second polarity of the noise-eliminated first binary signal;

said count part for delaying comprises:

a first counter counting the given clock pulses output from said first gate part; and a second counter counting the given clock pulses output from said second gate part; and said clear part for delaying switches the level of the output thereof to the first value and clears a count value of said first counter when the count value of said first counter reaches a first count value, and switches the level of the output thereof to the second value and clears a count value of said second counter when the count value of said second counter reaches a second count value.

24. The signal processing circuit as claimed in claim 14, wherein said noise elimination part comprises:

a gate part for noise elimination that outputs given clock pulses based on the first binary signal;

a count part for noise elimination that counts the given clock pulses; and a clear part for noise elimination that switches a level of an output thereof between first and second values based on a count value of said count part and clears the count value based on the level of the output.

25. The signal processing circuit as claimed in claim 24, wherein:

said gate part for noise elimination comprises:

a first gate part outputting the given clock pulses only during a period of a first polarity of the first binary signal; and a second gate part outputting the given clock pulses only during a period of a second polarity of the first binary signal;

said count part for noise elimination comprises:

a first counter counting the given clock pulses output from said first gate part; and a second counter counting the given clock pulses output from said second gate part; and said clear part for noise elimination switches the level of the output thereof to the first value and clears a count value of said first counter when the count value of said first counter reaches a first count value, and switches the level of the output thereof to the second value and clears a count value of said second counter when the count value of said second counter reaches a second count value.

26. The signal processing circuit as claimed in claim 14, wherein said gate part outputs the second binary signal only during a period of one of polarities of the signal output from said noise elimination part.

27. A method of extracting a signal superimposed on a reference signal varying in level at a given frequency, the superimposed signal being inserted into the reference signal at given positions of a given level thereof and having a peak level higher than a level of the reference signal by a value greater than a given value, the method comprising the steps of:

(a) generating a first binary signal by binarizing a composite signal of the reference signal and the superimposed signal by using a given reference level as a threshold value;

(b) eliminating noise from the first binary signal by using a cumulative length of time of each of polarities of the first binary signal;

(c) generating a second binary signal by binarizing the composite signal by using, as a threshold value, a level higher than the level of the reference signal by a value smaller than or equal to the given value; and (d) outputting the second binary signal based on a signal generated by said step (b).

28. The method as claimed in claim 27, wherein said step (b) eliminates the noise from and delays, for a given period of time, the first binary signal.

29. The method as claimed in claim 27, wherein said step (b) eliminates the noise from and changes a pulse width of the first binary signal.

30. The method as claimed in claim 27, wherein said step (b) eliminates the noise from, delays, for a given period of time, and changes a pulse width of the first binary signal.

31. The method as claimed in claim 27, wherein said step (d) outputs the second binary signal only during a period of one of polarities of the signal generated by said step (b).

* * * * *